United States Patent [19]

Thinschmidt et al.

[11] 4,334,308
[45] Jun. 8, 1982

[54] TEST FACILITY FOR ERROR DIAGNOSIS IN MULTI-COMPUTER SYSTEMS, PARTICULARLY IN MULTI-MICRO-COMPUTER SYSTEMS

[75] Inventors: Hans Thinschmidt, Germering; Eduard Scheiterer, Munich, both of Fed. Rep. of Germany

[73] Assignee: Siemens Aktiengesellschaft, Berlin & Munich, Fed. Rep. of Germany

[21] Appl. No.: 161,208

[22] Filed: Jun. 19, 1980

[30] Foreign Application Priority Data

Aug. 13, 1979 [DE] Fed. Rep. of Germany ....... 2932749

[51] Int. Cl.³ .................... G01R 31/28; G06F 11/00
[52] U.S. Cl. .................... 371/29; 324/73 R; 371/17; 364/900
[58] Field of Search .................... 371/17, 16, 29; 324/73 R, 73 AT; 364/900

[56] References Cited

U.S. PATENT DOCUMENTS

| | | | |
|---|---|---|---|
| 3,027,310 | 12/1975 | D'Anna et al. | 371/29 |
| 3,659,273 | 4/1972 | Knauft et al. | 371/17 |
| 3,813,531 | 5/1974 | King et al. | 371/17 |
| 3,937,938 | 2/1976 | Matthews | 371/17 |
| 3,939,333 | 2/1976 | Keech | 371/29 |
| 3,953,717 | 4/1976 | Rottier et al. | 371/17 |
| 4,253,183 | 2/1981 | Taylor et al. | 371/29 |

FOREIGN PATENT DOCUMENTS 2850606 5/1979 Fed. Rep. of Germany ........ 371/17

OTHER PUBLICATIONS

Greenwood, Text Step Sequencer and Scope Multiplexer Controller, IBM Technical Disclosure Bulletin, vol. 22, No. 3, Aug. 1979, pp. 1178-1179.
Cukier et al., Test Device for Microprocessor Programming, IBM Technical Disclosure Bulletin, vol. 21, No. 10, Mar. 1979, pp. 4076-4077.

Primary Examiner—Charles E. Atkinson
Attorney, Agent, or Firm—Hill, Van Santen, Steadman, Chiara & Simpson

[57] ABSTRACT

A test facility is disclosed for error diagnosis in multicomputer systems, particularly in multi-microcomputer systems in which signal voltages on the system bus in the error diagnosis are made perceptible as optical signals by display devices directly controlled by the signal voltages. A decoupling device is provided for connecting an evaluation/control logic to the system bus and an address/data information display device, an access signal display device, a bus control signal display device and an interrupt signal display device are provided. At least one comparator module is provided whose first group of signal inputs receives a binary information corresponding to a selection address, adjustable by means of a selection switch, and whose second group of signal inputs receive information concerning the address line of the system bus. The comparator module, given equality of the binary information corresponding to the selection address and an occurring address information, emits an output signal to provide an access signal simultaneously occurring on an access signal bus line which is switched on for the test facility by way of at least one logic element. The address data information display device is released by an access signal switched on in such a manner and the access signal display device and the interrupt signal display device contain display elements of a first group for rendering perceptible the momentary states of all access signal bus lines and of all interrupt signal lines, and respectively contain a second group of display means for rendering perceptible the access signal and/or interrupt signal which was respectively most recently active.

14 Claims, 5 Drawing Figures

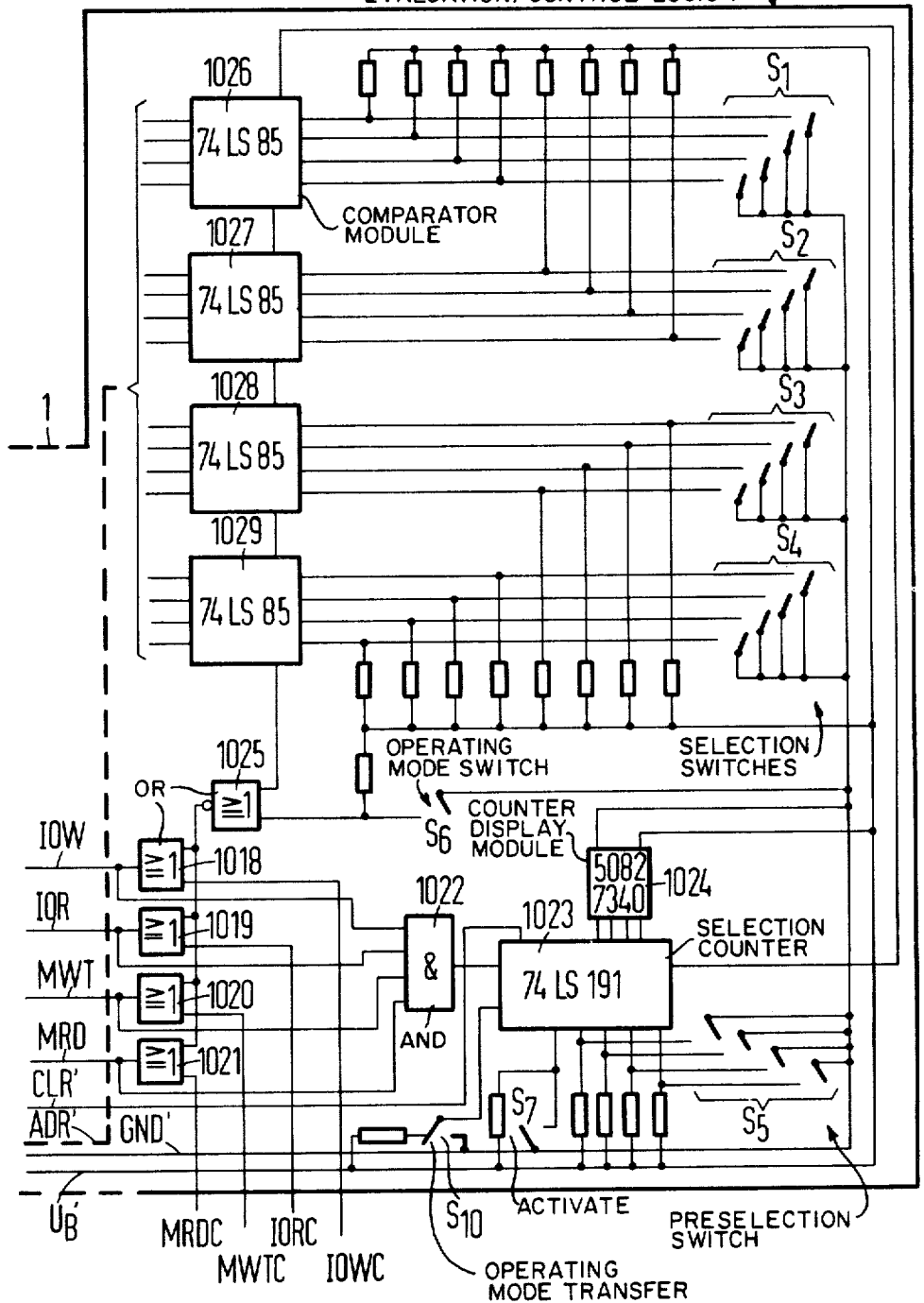

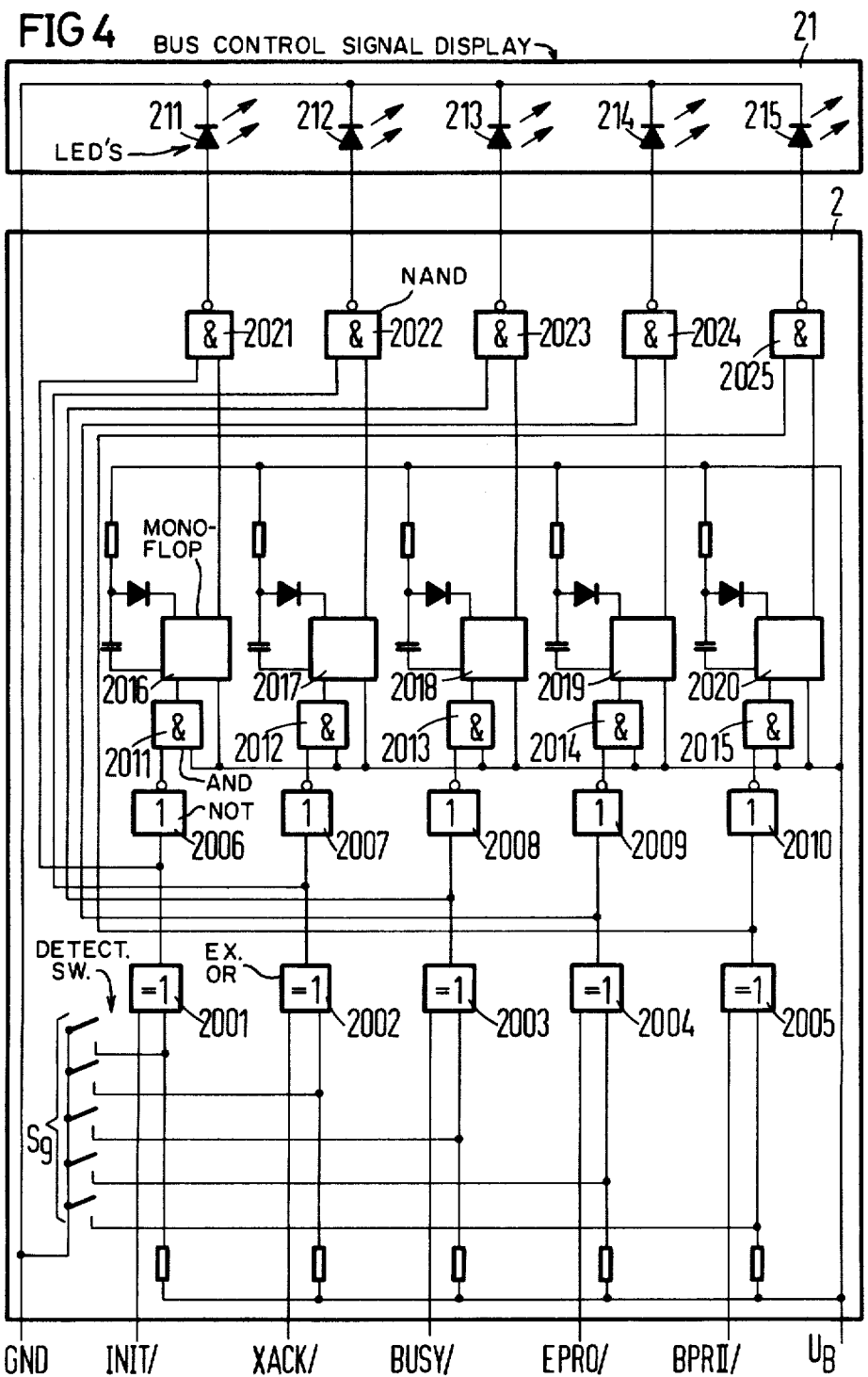

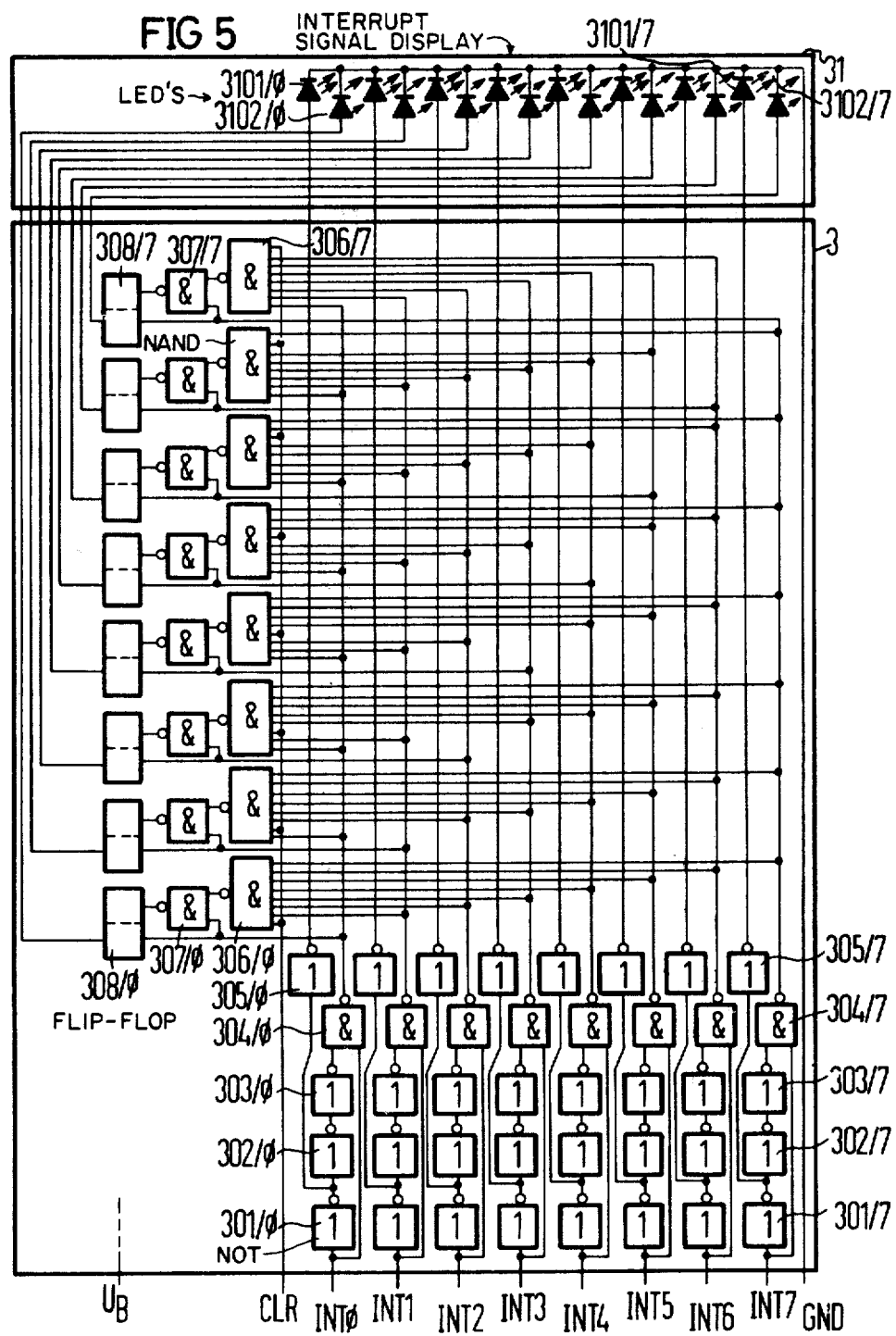

TEST FACILITY FOR ERROR DIAGNOSIS IN MULTI-COMPUTER SYSTEMS, PARTICULARLY IN MULTI-MICRO-COMPUTER SYSTEMS

BACKGROUND OF THE INVENTION

1. Field of the Invention

The present invention relates to a test facility for error diagnosis in multi-computer systems, particularly in multi-microcomputer systems, in which signal voltages on the system bus to be taken into consideration in the error diagnosis are made visible by means of display devices directly controlled by the signal voltages.

2. Description of the Prior Art

In multi-computer systems, particularly in such systems as are executed with microcomputers, it is necessary both in practical operation and in the development phase to perceive the states of all microcomputers as quickly as possible given occurring errors. Thereby, it is to be continuously clarified as to which microcomputer or microcomputers function erroneously and whether the case for an erroneous behavior is to be sought in the hardware or in the software. A significant indication for clarifying this question is supplied by considering all bus signals. Up to now, oscilloscopes, emulators and logic analyzers were available for these purposes as auxiliary structure. As is known, an oscilloscope is only slightly suitable for interpreting the bus signals of a microcomputer and an emulator is not suited at all. A logic analyzer would have to cover the full bus width (data, address, control, interrupt lines) with the plurality of its channels. In executed example of microcomputer systems, this would be approximately forty data and approximately ten trigger inputs, whereby the possibility to subdivide these inputs into three groups which operate independently of one another must exist. This existing condition, and the selection of the appropriate time grid group can make the employment of two or even three logic analyzers necessary. In addition, it involves a great deal of time to reprogram the logic analyzer for each error search. Moreover, the programming must be documented for reproducible results. Under certain conditions, this expense must be laid out for each microcomputer of the multicomputer system concerned.

SUMMARY OF THE INVENTION

The object of the present invention is to provide a test facility for error diagnosis in multi-computer systems with whose assistance the disadvantages or, respectively, deficiencies set forth above, can be eliminated.

The above object can be achieved, according to the present invention, by means of a test facility for error diagnosis in multi-computer systems, particularly in multi-microcomputer systems, in which signal voltages on the system bus to be taken into consideration in the error diagnosis are made visually perceptible by means of display devices directly controlled by the signal voltages. The test facility constructed in accordance with the present invention is characterized in that a decoupling device for connecting an evaluation/control logic to the system bus is provided. An address/data information display device, an access signal display device, a bus control signal display device and an interrupt signal display device are provided. At least one comparator module, known per se, is provided, and has one group of signal inputs for receiving a binary information corresponding to a preselectable selection address adjustable by means of a selection switch is supplied and has a second group of signal inputs for receiving all address information concerning the address line of the system bus. The comparator module, given equality of the binary information corresponding to the selection address with an occurring address information, emits an output signal by means of which an access signal simultaneously occurring on an access signal bus line (for example, MRDC) is activated by way of at least one linkage element for the test facility. The address/data information display device is released by means of an access signal activated in that manner. The access signal display device and the interrupt display device respectively contains display means of a first group for rendering perceptible the momentary states of all access signal bus lines and all interrupt signal lines and respectively contain a second group of display means for rendering perceptible the access signal and/or the interrupt signal which was respectively most recently active.

The invention offers the advantage that all bus signals can be made visible simultaneously. In the access and interrupt signals, both the momentary states and the most recently active signal of the assigned signal group are advantageously displayed. In addition, the individual display devices can optionally be released by means of a specific, preselectable addressing, so that a simple possibility of tracing error sources is provided. In addition, the inventive test facility advantageously does not influence the system to be checked.

A further development of the invention is characterized in that there are provided a first comparator module with a first selection switch, a second comparator module with a second selection switch, a third comparator module with a third selection switch and a fourth comparator module with a fourth selection switch. The comparator modules are interconnected by way of their respective auxiliary signal inputs and signal outputs in such a manner that a common comparator module output signal is emitted by one of the comparator modules in the case in which a binary information extending over all signal inputs belonging to the first group of signal inputs is identical to an address information extending over all signal inputs belonging to the second group of signal inputs.

A further development of the invention offers the advantage that the inventive test facility can be employed in any desired multicomputer systems having addresses which are as long as required.

Another further development of the invention is characterized in that a selection counter is provided, by means of which the plurality of addressing events corresponding to a preselected selection address can be determined. A preselection switch is provided by means of which the plurality of the addressing events corresponding to a preselected selection address can be determined. A preselection switch is provided by means of which the plurality of the addressing events can be preselected in that a binary information representing the plurality to be preselected is fed, via the switching points of the preselection switch, to the preselection signal inputs which exist at a selection counter.

This further development of the invention is advantageous insofar as a plurality of addressing events determinable by the person seeking the error can be monitored for the selection address concerned. Exceeding, or falling below, this specific plurality allows further conclusions concerning possible error sources.

Moreover, the invention is further developed in such a manner that a transfer switch is provided by means of which the mode of operation of the selection counter can be transferred, so that, advantageously, an enumeration or a through-count up to a plurality of addressing events to be preselected by means of the preselection switch is rendered possible.

In another further development of the invention, the invention is characterized in that a plurality of bus control signal display means are provided within the bus control signal display device, to which retriggerable monoflops respectively individually assigned are directly preconnected, by means of which monoflops short individual reactions, such as needle pulses, occurring on the bus control signal lines transmitting the bus control signals can be identified and made perceptible in temporal expansion.

What is advantageous in this further development of the invention is that dynamic interference sources which, under certain conditions, become effective only once during a test operation, can be identified under specific, favorable conditions.

Moreover, the invention is further developed to the effect that a detection switch is provided. EXCLUSIVE OR elements respectively individually assigned to the bus control signal lines are provided. Signals transmitted by way of the appertaining bus control signal lines can be supplied to a respectively first signal input of the EXCLUSIVE OR elements and either a continuous signal with the level "1" or the level "0" can be supplied to a respectively second signal input of the EXCLUSIVE OR element by means of the detection switch, so that, advantageously, short individual reactions on the assigned bus control signal lines can be detected with the signal level "1"or the signal level "0".

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 shows, in schematic logic diagram form, an examplary embodiment of a second portion of the first evaluation/control logic 1;

FIG. 4 illustrates, also in a logic block diagram form, an exemplary embodiment of a second evaluation/control logic 2 and the bus control signal display means 21; and FIG. 5 illustrates, in a schematic representation and logic diagram form, an exemplary embodiment of a third evaluation/control logic 3 and the interrupt signal display device 31.

DESCRIPTION OF THE PREFERRED EMBODIMENTS

Figure 1:
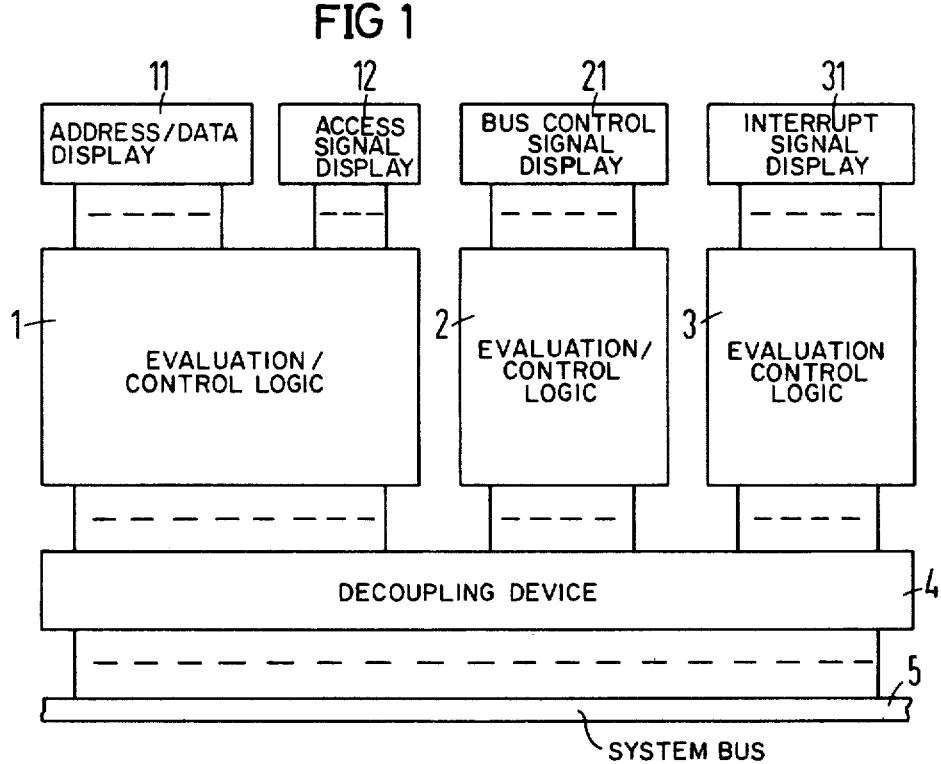
FIG. 1 is an overview circuit diagram showing the fundamental structure of a test facility constructed in accordance with the present invention and having a first evaluation/control logic 1, an address/data information display device 11, an access signal display device 12, a second evaluation/control logic 2, a bus control signal display device 21, a third evaluation/control logic 3, an interrupt signal display device 31 and a decoupling means 4 by way of which the first, second and third evaluation/control logics are connected to the system bus of a multi-computer system to be tested.

As already explained, FIG. 1, in the form of an overview circuit diagram, illustrates the fundamental structure of a test facility constructed in accordance with the present invention and having a first evaluation/control logic 1, an address/data information display device 11, an access signal display device 12, a second evaluation/control logic 2, a bus control signal display device 21, a third evaluation/control logic 3, an interrupt signal display device 31 and a decoupling device 4 by way of which the first, second and third evaluation/control logics are connected to the system bus 5 of a multi-computer system to be tested.

Figure 2:
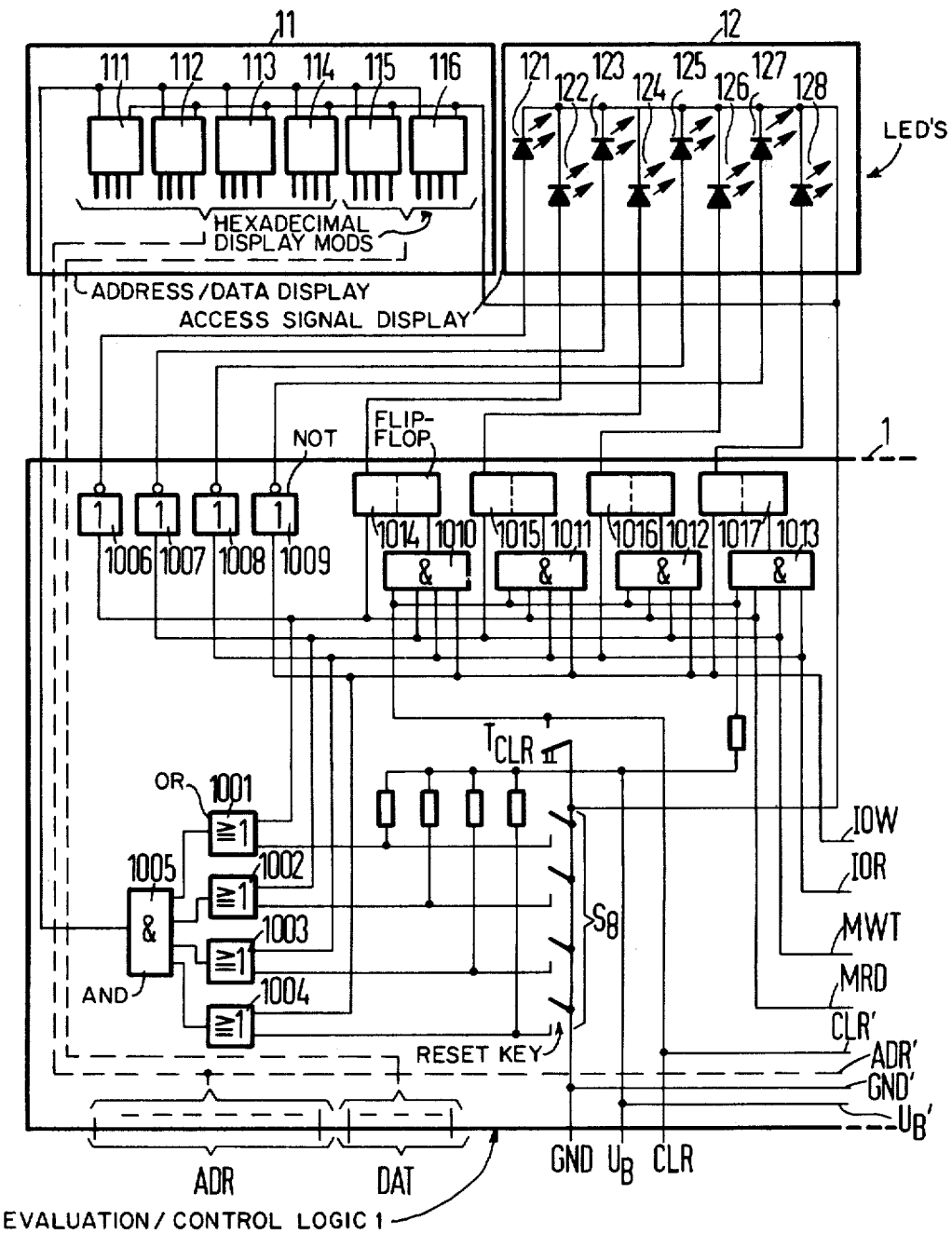
FIG. 2 is a schematic logic diagram of an exemplary embodiment of a first portion of the first evaluation/control logic 1, the address/data information display device 11 and the access signal display device 12.

FIGS. 2 and 3, as already explained above, illustrated the format of an exemplary embodiment of a first part of the first evaluation/control logic 1, the address/data information display 11 and the access signal display device 12, as well as the circuit format of an exemplary embodiment of a second part of the first evaluation/control logic 1.

As can be seen from FIG. 1, the first evaluation/control logic 1 is connected by way of the decoupling means 4 with address lines ADR, data lines DAT, cf. FIG. 2, and a plurality of access signal bus lines, namely MRDC, MWTC, IORC, IOWC, cf. FIG. 3, to the system bus 5. Moreover, the first evaluation/control logic 1 is connected to an operating voltage by way of an operating voltage line $U_B$ and a ground line GND. A reset key $T_{CLR}$, to be explained below, also influences the third evaluation/control logic 3 by way of a reset line CLR, cf. FIG. 5. The part of the first evaluation/control logic, cf. FIG. 2, is connected to the second part of the first evaluation/control logic 1, cf. FIG. 3, by way of a plurality of access signal lines, namely, IOW, IOR, MWT, MRD, as well as an internal reset line CLR', an internal address line ADR' an internal operating voltage line $U_B'$ and an internal ground line GND'. The address lines ADR and the data lines DAT, moreover, are connected to corresponding signal inputs of hexadecimal display modules 111, 112, 113, 114, 115, 116 within the address/data information display device 11. The operating voltage supply of the hexadecimal display modules occurs, on the one hand, by way of the operating ground GND, and, on the other hand, by way of a matrix consisting of an AND element 1005 and a plurality of OR elements 1001, 1002, 1003 and 1004. The manner of operation of such matrices is known per se. The respective signal outputs of the OR elements are connected to the signal inputs of the AND element. The signal output of the AND element is connected to the respectively assigned operating voltage terminal of all hexadecimal display modules. Preprocessed access signals transmitted by way of the access signal lines IOW, IOR, MWT, MRD from the second part of the first evaluation/control logic 1 are supplied to the respective first signal inputs of the OR elements. The operating voltage potential $U_B$ which corresponds to the signal level "1" can be supplied to the respective second signal inputs of the OR elements via resistors or, optionally, ground potential, which corresponds to the signal level "0" can be supplied by way of a release switch $S_8$. It can be determined with the release switch $S_8$ with which type of access signal the address/data information display device 11 is to be released. The access signal lines IOW, IOR, MWT, MRD, moreover, are fed via NOT elements 1006, 1007, 1008 and 1009 to display means, namely, light emitting diodes (LED's) of a first group 121, 123, 125, 127 within the access signal display device 12. These display means are applied to ground potential with their respective second connections. According to the invention, these display means of the first group are executed as LED's of a first type of light color, preferably green emitting LED's. A second group of display means, namely 122, 124, 126, 128 within the access signal display device 12 is executed with LED's of a second type of light color, preferably red emitting LED's. The display means of the first group respectively display the momentary state of the appertaining access signal. The display means of the second group display the respective access signal which had been most recently active. To this end, these display means are applied to the respective first signal outputs of flip-flops individually assigned thereto, namely, 1014, 1015, 1016 and 1017. The respective second terminals of the LED's of the second group are likewise connected to ground potential. In order to achieve the object of the invention, in particular, the display of their respective access signal which had been most recently active, the display means of the second group 122, 124, 126 and 128 can be switched on or, respectively, off, by way of the flip-flop, whereby the setting input of one flip-flop is connected to the appertaining access signal line and the reset input of each flip-flop is connected to the signal output of an AND element individually assigned thereto, namely, 1010, 1011, 1012 and 1013. These AND elements are continuously connected to an operating voltage potential $U_B$, which corresponds to the signal level "1", by way of a drop resistor assigned thereto and common. The respective further inputs of the AND elements are connected to the respective remaining access signal lines which are respectively connected to the setting inputs of all further flip-flops. The matrix formed of the flip-flops 1014, 1015, 1016 and 1017 and the AND elements 1010, 1011, 1012 and 1013 accordingly fulfills the object mentioned above.

In the second portion of the first evaluation/control logic 1 cf. FIG. 3, the access signal bus lines MRDC, MWTC, IORC, IOWC are respectively connected to a first signal input of an OR element 1018, 1019, 1020, 1021 assigned to each line. The second signal inputs of these OR elements are connected, in common, to the signal output of a NOR element 1025. The assigned access signal lines IOW, IOR, MWT, MRD and the individual signal inputs of a further AND element 1022 are connected to the respective signal outputs of the OR elements 1018, 1019, 1020, 1021. The signal output of the AND element 1022 is connected to an activation input of a selection counter 1023. The counting input of the selection counter 1023 is connected to the signal output of the last comparator module of a group of comparator modules 1026, 1027, 1028 and 1029 which are connected in series with respect to their signal inputs and signal outputs. The comparator modules, which are known per se, each have two groups of signal inputs. The leads of the internal address line ADR' which are, in turn, connected to the address line ADR of the system bus 5 are connected to the signal inputs of the first group. The operating voltage potential $U_B$ is applied to the signal inputs of each second group via individual drop resistors via the internal operating voltage line $U_B'$. This arrangement means that, in the control case, signals with the level "1" are supplied to the signal inputs of the respective second group. The signal inputs of the second group of the comparator modules, however, can be optionally individually connected to ground potential, namely, the signal level "0" via selection switches S1, S2, S3 and S4 individually assigned thereto. With this structure, the possibility is provided for selecting a specific address with the assistance of the comparator modules and of the selection switch, namely, a bit combination belonging to such an addressing. The selection counter 1023, to which a counter display module 1024 is assigned, the display module preferably also executed as a hexadecimal display module, counts the plurality of the selection addresses which are supplied to the test facility. With the assistance of a preselection switch S5, the plurality of addressing events can be preselected in that a binary information representing the plurality to be preselected is fed by way of the contacts of the switch S5 to the preselection signal inputs provided at the selection counter 1023. This is achieved in that, as a rule, operating voltage potential which corresponds to the signal level "1" and, optionally, ground potential which corresponds to the signal level "0" can be supplied to the preselection signal inputs by way of individually assigned drop resistors. With the assistance of an operating mode switch S6, the circuit elements provided for an address selection can be switched on or off. This occurs in that ground potential or operating voltage potential, which correspond to the signal level "0" or the signal level "1", respectively, can be optionally supplied to the first signal input of the aforementioned NOR element 1025. The second signal input of the NOR element 1025 is connected to a signal output of the first comparator module, namely the module 1029, of all of the comparator modules connected in series. It is achieved by way of this latter connection that the access signal lines IOW, IOR, MWT, MRD, depending on the position of the operating mode switch S6, are either only switched on when a bit pattern corresponding to a selection address preselected by means of the selection switches S1, S2, S3 and S4 is supplied to the arrangement of the comparator modules via the internal address line ADR' or when the operating mode switch S6 is closed. With the assistance of an activating switch S7, the selection counter 1023 can be switched on or off. Moreover, a transfer switch S10 is provided for transferring the operating mode of the selection counter 1023, so that either an enumeration or a through-count up to a plurality of addressing events to be preselected by means of the preselection switch 5 is made possible. With the assistance of the reset key $T_{CLR}$ (FIG. 2), all flip-flops 1014, 1015, 1016 and 1017 are directly resettable and by way of the AND elements 1010, 1011, 1012, 1013 (FIG. 2) and, in conjunction with the internal reset lines CLR', the selection counter 1023 of FIG. 3 can be charged with the counting value preselected by means of the preselection switch S5.

FIG. 4, as already set forth above, illustrates the circuit format of an exemplary embodiment of the second evaluation control logic 2 and the bus control signal display device 21. All bus control signal lines INIT/,XACK/,BUSY/, EPRO/, BPRIL/ as well as the operating voltage line $U_B$ and the ground line GND are supplied to the second evaluation control logic 2. The bus control signal lines are respectively connected to a first signal input of an EXCLUSIVE OR element 2001, 2002, 2003, 2004 and 2005 individually assigned to each of these lines. The operating voltage potential $U_B$ which corresponds to the signal level "1", or, by way of a detection switch S9, ground potential which corresponds to the signal level "0" can be optionally applied to the respective second signal inputs of the EXCLUSIVE OR elements. The signal outputs of the EXCLUSIVE OR elements are respectively applied, on the one hand, to the signal input of an individually assigned NOT element 2006, 2007, 2008, 2009 and 2010 and to the respective first signal input of a likewise individually assigned NAND element 2021, 2022, 2023, 2024 and 2025. The second signal inputs of the NAND elements are connected to a respective signal output of an individually assigned retriggerable monoflop 2016, 2017, 2018, 2019 and 2020. A first signal input of each retriggerable monoflop is permanently connected to the operating voltage $U_B$ and a second signal input of the retriggerable monoflop is connected to the signal output of the individually assigned further AND element 2011, 2012, 2013, 2014 and 2015. From these further AND elements 2011, 2012, 2013, 2014 and 2015 a respective signal input is likewise permanently connected to the operating voltage potential $U_B$. The other signal input is connected to the signal output of the individually assigned, aforementioned NOT elements 2006, 2007, 2008, 2009 and 2010. Integration elements, known per se and consisting of a resistor, a diode and a capacitor, are assigned to the retriggerable monoflops 2016, 2017, 2018, 2019 and 2020. The signal outputs of the NAND elements 2021, 2022, 2023, 2024 and 2025 are connected to individually connected bus control signal display means 211, 212, 213, 214 and 215 within the bus control signal display device 21. The second terminals of the display means, executed as light emitting diodes in the exemplary embodiment illustrated herein, are connected, in common, to ground potential. With the assistance of the retriggerable monoflops 2016, 2017, 2018, 2019 and 2020, it is possible that short individual reactions, such as needle pulses, occurring on the bus control signal lines INIT/,XACK/,BUSY/, EPRO/ and BPRII transmitting the bus control signals can be identified and made visually perceptible and temporally expanded.

FIG. 5, as already explained above, illustrates the circuit format of an exemplary embodiment of the third evaluation control control logic 3 and the interrupt signal display device 31. All interrupt lines of the system to be tested, INT0, INT1, INT2, INT3, INT4, INT5, INT6 and INT7, as well as the operating voltage line $U_B$, the ground line GND and the reset line CLR are supplied to the third evaluation/control logic 3. The interrupt lines, by way of series connections of NOT elements 301/φ–301/7, 302/φ–302/7, 303/φ–303/7 individually assigned thereto, are conducted in a manner illustrated to a respective first signal input of a NAND element 304/φ–304/7 individually assigned to an interrupt line. The interrupt lines are likewise respectively directly connected to the second signal input of the latter NAND elements. It is achieved with the assistance of this circuit arrangement that the interrupt signals are switched-on delayed in comparison to the addressing, access and bus control signals. The signal inputs of further NAND elements 306/φ–306/7 which are individually assigned to all neighboring interrupt lines are connected to the signal outputs of the NAND elements 304/φ–304/7. Moreover, the signal output of each of the NAND elements 304/φ–304/7 is connected to the second input of a flip-flop 308/φ–308/7 individually assigned to the appertaining interrupt line. The signal output of such a NAND element 304/φ–304/7, moreover, is connected to a first signal input of a further NAND element 307/φ–307/7 likewise individually assigned to the appertaining interrupt line. The second signal input of these further NAND elements is respectively connected to the signal output of the previously-mentioned NAND elements 306/φ–306/7. The signal output of each of the NAND elements 307/φ–307/7 is connected to the reset input of the flip-flop 308/φ–308/7 assigned to the appertaining interrupt line. The signal outputs of the flip-flop 308/φ–308/7 are connected to the first terminals of a display means of a second group 3102/φ–3102/7 within the interrupt signal display device 31. The display means, which in the exemplary embodiment illustrated, are executed as LED's, and are individually assigned to the interrupt lines, as are further display means of a first group, namely, 3101/φ–3101/7. These latter display means are likewise executed in the examplary embodiment illustrated as LED's whose first terminals are connected to further NOT elements 305/φ–305/7 individually assigned to interrupt lines. The second terminals of all display means 3101φ–3101/7, 3102/φ–3102/7 are connected in common, to ground potential. The signal inputs of the latter NOT elements 305/φ–305/7 are connected, in the exemplary embodiment illustrated, to the signal outputs of the respective first NOT elements 301/φ–301/7 which are individually assigned to the interrupt lines. The display means of the first group 3101/φ–3101/7 contained in the interrupt signal display device 31 are executed as LED's of a first type of light color, preferably green emitting LED's, and the display means of the second group 3102/φ–3102/7 are executed as LED's of a second type of light color, preferably red emitting LED's. The display means 3101/φ–3101/7 display the momentary states of the interrupt signal lines. The display means 3102/φ–3102/7 respectively display the interrupt signal which was most recently active. The linkage arrangement described renders possible this circuit operation in a known manner.

The flip-flops 308/φ–308/7 can be directly reset by way of their reset inputs with the assistance of the reset key $T_{CLR}$, namely, by way of the NAND elements 306/φ–306/7 or, respectively, 307/φ–307/7.

All of the bus signals evaluated and linked by the test facility constructed in accordance with the present invention can be employed for triggering external devices. The dynamic behavior of the display devices is revealing in an error search. In contrast to emulators, the test facility constructed in accordance with the present invention does not influence the operating conditions of the system to be tested. Moreover, the test facility, in contrast to a logic analyzer, guarantees real time measurements. The low circuit expense and the simple operation render it possible, given a multi-computer system, to equip each individual computer, for example, each microcomputer, with a test facility constructed in accordance with the present invention.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

I claim:

1. A test facility for error diagnosis in multicomputer systems in which a plurality of computers are connected to a system bus, the test facility comprising;
   an address/data information optical display device;
   an access signal optical display device;
   a bus control signal optical display device;
   an interrupt signal optical display device;
   a first evaluation/control logic device connected to said address/data information device and to said access signal display device;
   a second evaluation/control logic device connected to said bus control signal device;
   a third evaluation/control logic device connected to said interrupt signal display device;
   a coupling/decoupling device for connection to the system bus and to said first, second and third evaluation/control logic devices and operable to selectively connect the evaluation/control logic devices to the system bus;
   selection switching means operable to provide a first group of selection signals corresponding to selection address;
   at least one comparator in each of said evaluation/control logic devices including first inputs connected to said selection switching means to receive said first group of selection signals and second inputs connected to receive address information signals from said system bus, said comparator responsive to equality of the selection signals and the address information signals to produce an output signal for switching through an access signal on the system bus;
   said address/data information display device responsive to a switched-through access signal; and
   said access signal display device and said interrupt signal display device each including first display means responsive to control signals to display the momentary states of all access and interrupt signals on the system bus and second display means responsive to the last-occurring signals on the system bus to display the most recently occurring access and interrupt information.

2. The test facility of claim 1, and further comprising: mode switching means connected in circuit with said selection switching means for switching the same on and off.

3. The test facility of claim 1, wherein: each of said display modules of said address/data display device are hexadecimal display modules.

4. The test facility of claim 1, wherein said access signal optical display device comprises:
   a first group of light emitting diodes of a first color; and a second group of light emitting diodes of a second color.

5. The test facility of claim 1, wherein said interrupt signal display device comprises:
   a first group of light emitting diodes of a first color; and a second group of light emitting diodes of a second color.

6. The test facility of claim 1, and further comprising:
   a plurality of optical bus control signal display elements in said bus control signal optical display device; and
   a plurality of retriggerable monoflops each connected to receive signals from the system and to a respective display element for rendering perceptible and temporally expand short pulses.

7. The test facility of claim 6, and further comprising:
   a plurality of EXCLUSIVE OR elements individually assigned to the bus control signal lines;
   a detection switch connected to said EXCLUSIVE OR elements for selectively providing first and second binary values thereto for rendering possible the detection of short signals on the bus control signal lines as first or second binary values.

8. The test facility of claim 1, wherein:
   said selection switching means comprises a plurality of switches;
   each of said evaluation/control logic modules comprises a plurality of said comparators connected in series and each including said first input connected to a respective selection switch and a second input for receiving address information signals from said system bus;
   the last comparator of the series operable to emit the output signal in response to equality of all of the signals fed to each of the comparators.

9. The test facility of claim 8, and further comprising:
   a selection counter connected to said comparator; a preselection switch connected to said selection counter for setting the same to preselection addressing events.

10. The test facility of claim 9, and further comprising:
    a release switch for selecting which control signals will be fed to the display devices.

11. The test facility of claim 9, and further comprising:
    activating switching means connected to switch said selection counter on and off.

12. The test facility of claim 9, and further comprising:
    a transfer switch connected to said selection counter for transferring operation thereof between counting and counting up to a number of addressing events preselected by said preselection switch.

13. The test facility of claim 12, and further comprising:
    a count display module connected to said selection counter for displaying the reading thereof.

14. The test facility of claim 13, and further comprising:
    a reset key connected in circuit with said display modules of said address/data information display device for extinguishing the display.

* * * * *